METHOD OF HEAT TREATING SEMICONDUCTOR DEVICES TO STABILIZE CURRENT AMPLIFICATION FACTOR CHARACTERISTIC

Filed March 7, 1962

INVENTORS
M. SHIRAISHI
M. TAKASHIMA
A. KAWAJI

BY Roy C. Hopgood
ATTORNEY

United States Patent Office 3,231,436
Patented Jan. 25, 1966

3,231,436

METHOD OF HEAT TREATING SEMICONDUCTOR DEVICES TO STABILIZE CURRENT AMPLIFICATION FACTOR CHARACTERISTIC

Masamichi Shiraishi, Masaki Takashima, and Akira Kawaji, all of Tokyo, Japan, assignors to Nippon Electric Company Limited, Tokyo, Japan, a corporation of Japan Filed Mar. 7, 1962, Ser. No. 178,058
4 Claims. (Cl. 148—171)

This invention relates to a method of manufacturing semiconductor devices, and more particularly to a method of thermally aging semiconductor devices to prevent drift in current amplification factor, collector cut-off current, leakage current, and other characteristics which would otherwise change during the operating life of the device.

Thermal aging of semiconductor devices has been known in the prior art, but the method heretofore practiced only partially stabilized the characteristics of the semiconductor device. Furthermore, in the prior art method, the current amplification factor was stabilized at a relatively low level while the leakage current was stabilized at a relatively high level. The present invention, however, provides a novel thermal aging method which obviates the above noted shortcomings.

In the prior art thermal aging method, since a low melting point metal like indium or lead alloy is used as the junction electrode of the semi-conductor device, it was considered impossible to carry out heat aging at a temperature higher than the melting point of the low melting point material for the reason that the semiconductor equipment would be destroyed. Therefore, in the prior art aging method, which is carried out at lower temperature than the melting point of the above mentioned alloying material, a long period of aging at about 100° C. has been used in devices that contain an indium alloy. However, when we examine the surface condition after heating the device in dry air, we find clearly that the surface of the metal is not stabilized by that temperature. For example, when we alloy an indium strip on thin *n* type germanium strip and examine by the Thomas-Ledecker method the change of surface recombination speed due to atmosphere, we find that by heating in air at 100° C. for over five hours and then cooling slowly, an unstable surface of germanium is obtained, while by heating over two hours at 500° C., a considerably stable surface can be obtained. In the high temperature case, the indium strip is remelted of course, but since it has been heated in an oxidizing atmosphere, the surface of the indium is oxidized, and unless the device is vibrated strongly while it is in the liquid state, no short circuiting of base collector or base emitter occurs due to flow of indium.

Figure 1:
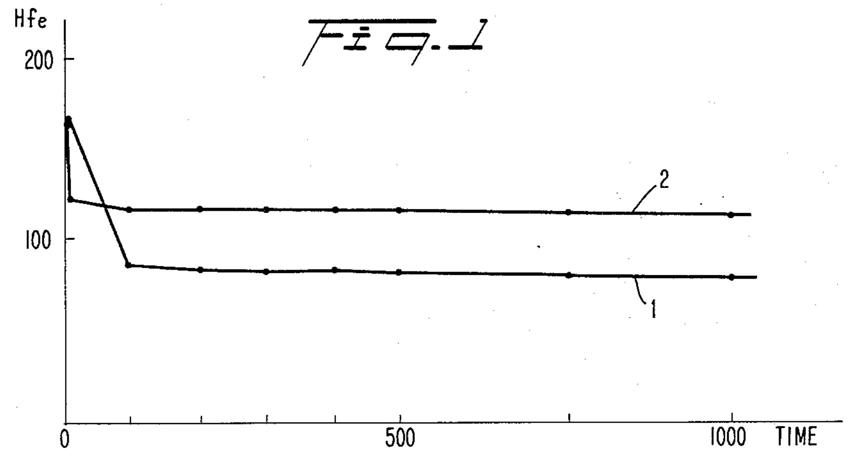
Figure 2:
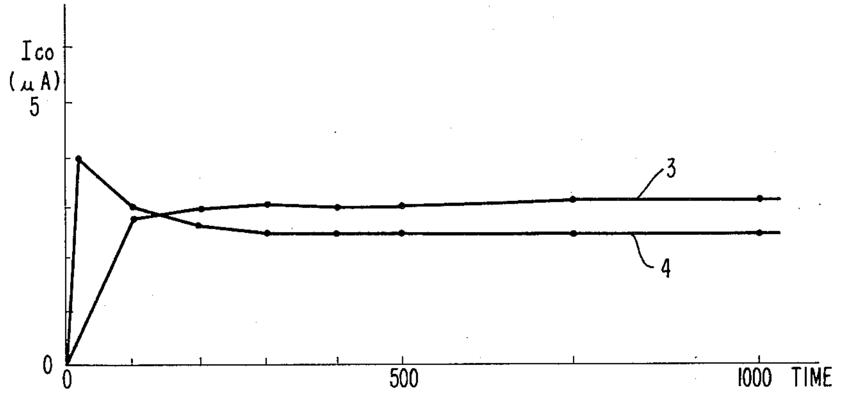

When we applied the above idea to our method in heat aging of actual semiconductor device, we obtained a very good result. That is, we put into the semiconductor device a drying agent at the time of cap sealing, and then sealed the cap under dry conditions, and heated the device to 450° C. and slowly cooled it. When we tried a life test of the device, we obtained very good results, as shown in FIGS. 1 and 2. In FIG. 1, curve 1 shows the variation with the time from initial value of current amplification factor ($V_{CB}=6$ *v.*, $I_E=I_{ma.}$) in the prior art thermal aging method in which the device is subjected to a forced deterioration by keeping the device at high temperature of 95° C. after thermal aging at 100° C. as usual. Curve 2 shows variation with time of the current amplification factor under the same condition for the device after thermal aging at 450° C. for two hours in accordance with the method of this invention. In the case of the prior art thermal aging method, the current amplification is lowered very markedly, being decreased by 30–50% from the initial value as is shown in curve 1 of FIG. 1. But in the case of the present invention, current amplification is lowered only by about 10–30% as is shown in curve 2 of FIG. 1, and the characteristics become very stable.

In FIG. 2 curve 3 shows variation with time of collector cut off current ($V_{cBo}=-20$ *v.*) in the case of the above mentioned high temperature storage after thermal aging by the prior art method. Curve 4 shows variation with time of the cut off current under the same condition after thermal aging by the method of this invention. The cut off current is improved considerably. This is considered to be due to the reason that oxygen in dry air in the enclosure oxidizes the inner wall of the environment as well as the semiconductor surface. Thus the surface of the semiconductor is changed to more more stable germanium oxide, and at the same time the oxygen in the enclosure is almost exhausted, and only nitrogen remains sealed in the enclosure. Thus in the case of pnp transistor, the current amplification is decreased, and growth of the inversion layer, which has the effect of increasing leakage current at the surface of the pn junction, is prevented. Also in general, in the emitter side of the pnp transistor, in order to increase the current amplification factor, impurities having high injection efficiency of holes like gallium, aluminum and other materials are added; but when high temperature aging as in this invention is carried out, the junction material is remelted, and when solidification takes place, it proceeds toward germanium, due to good heat conductivity of the electrode metal. Therefore, the material of high injection efficiency is segregated at the pn junction, and thus we can increase the current amplification factor even after the cap is sealed.

Although the foregoing description sets forth a concrete example of this invention by way of example, it should be understood that this invention is by no means limited to the concrete example disclosed, since many modifications can be made therein without departing from the basic teaching of this patent application. This invention includes all modifications falling within the scope of the following claims.

We claim:

1. A method of thermally aging indium-germanium alloy type semiconductor devices comprising the steps of encapsulating said alloy type semiconductor device, said alloy being formed of an indium strip on a strip of germanium, heating said encapsulated device to a temperature of approximately 450° C. for a length of time sufficient to stabilize the current amplification factor characteristic of said device, and cooling said device back to its normal temperature whereby substantially improved thermal aging of said device is achieved.

2. A method of thermally aging indium-germanium alloy type semiconductor devices comprising the steps of sealing an alloy type semiconductor material and a drying agent in a common capsule, said material being formed of an indium strip on a body of germanium, heating said capsule to a temperature of at least 450° C. for a length of time sufficient to stabilize the current amplification factor characteristic of said device, and cooling said capsule back to its normal temperature whereby said characteristics are significantly improved over aging methods wherein the aging temperature is restricted to a range below the melting temperature of said alloy.

3. A method for aging an alloy type indium-germanium semiconductor device which comprises the steps of enclosing said device in an air tight medium, said device including an indium strip alloyed to a germanium body, providing in the enclosure an atmosphere having oxygen in an amount effective to produce an oxidation coating on said indium, heating said device to a temperature of at least approximately 450° C., maintaining said device at a temperature of at least approximately 450° C. for approximately two hours to stabilize the current amplification factor characteristic thereof, and cooling said device back to room temperature, whereby improved thermal aging of said device is achieved.

4. A method for aging an indium-germanium alloy type semiconductor device which comprises the steps of sealing said device together with a deliquescent substance in an enclosed atmosphere, said device including an indium element alloyed to a germanium body, heating said device to a temperature at least as high as the melting point of the alloy, maintaining said device at a temperature above approximately 450° C. for a length of time sufficient to substantially stabilize the current amplification factor characteristic of said device, and cooling said device back to room temperature, whereby said characteristics are significantly improved over aging methods wherein the aging temperature is restricted to a range below the melting point of said alloy.

References Cited by the Examiner

UNITED STATES PATENTS

| | | | |
|---|---|---|---|
| 2,639,246 | 5/1953 | Dunlap | 148—1.5 |
| 2,644,852 | 7/1953 | Dunlap | 148—1.5 |
| 2,694,168 | 11/1954 | North et al. | 148—1.5 X |
| 2,698,780 | 1/1955 | Logan et al. | 148—13.1 |
| 2,788,382 | 4/1957 | Faus et al. | 136—5 |
| 2,789,068 | 4/1957 | Maserjian | 148—180 |
| 2,943,005 | 6/1960 | Rose | 148—1.5 |
| 3,111,433 | 11/1963 | Logan et al. | 148—13.1 |
| 3,129,119 | 4/1964 | Rouse et al. | 148—13.1 |

OTHER REFERENCES

Theuerer et al.: Article in the Transactions of the AIME, vol. 189, January 1951, pages 59–63.

DAVID L. RECK, *Primary Examiner.*